US011905937B2

(12) United States Patent
Zhao et al.

(10) Patent No.: US 11,905,937 B2
(45) Date of Patent: Feb. 20, 2024

(54) MAGNETIC POLE STRUCTURE FOR HALL THRUSTER

(71) Applicant: SHANGHAI INSTITUTE OF SPACE PROPULSION, Shanghai (CN)

(72) Inventors: Zhen Zhao, Shanghai (CN); Jiabing Cheng, Shanghai (CN); Xiaolu Kang, Shanghai (CN); Yanan Wang, Shanghai (CN); Leichao Tian, Shanghai (CN); Zhiyuan Zhang, Shanghai (CN); Qingqing Jia, Shanghai (CN); Caixia Qiao, Shanghai (CN); Guanrong Hang, Shanghai (CN)

(73) Assignee: SHANGHAI INSTITUTE OF SPACE PROPULSION, Shanghai (CN)

( * ) Notice: Subject to any disclaimer, the term of this patent is extended or adjusted under 35 U.S.C. 154(b) by 0 days.

(21) Appl. No.: 18/029,382

(22) PCT Filed: Nov. 15, 2021

(86) PCT No.: PCT/CN2021/130580
§ 371 (c)(1),
(2) Date: Mar. 30, 2023

(87) PCT Pub. No.: WO2022/142776
PCT Pub. Date: Jul. 7, 2022

(65) Prior Publication Data

US 2023/0358216 A1 Nov. 9, 2023

(30) Foreign Application Priority Data

Dec. 28, 2020 (CN) ........................ 202011587160.2

(51) Int. Cl.
*F03H 1/00* (2006.01)

(52) U.S. Cl.
CPC ......... *F03H 1/0068* (2013.01); *F03H 1/0006* (2013.01)

(58) Field of Classification Search
CPC ..... F03H 1/0006; F03H 1/0068; F03H 1/0075
See application file for complete search history.

(56) References Cited

U.S. PATENT DOCUMENTS 5,847,493 A * 12/1998 Yashnov ............... F03H 1/0075 313/361.1
6,215,124 B1 * 4/2001 King ..................... F03H 1/0075 315/501

(Continued)

FOREIGN PATENT DOCUMENTS

CN 106837722 A * 6/2017 ........... F03H 1/0081
CN 104632565 B * 10/2017 ........... F03H 1/0081

*Primary Examiner* — Jason H Duger
(74) *Attorney, Agent, or Firm* — Bayramoglu Law Offices LLC

(57) ABSTRACT

A magnetic pole structure for a Hall thruster is provided. The magnetic pole structure includes: multiple wide-envelope outer magnetic pole components, a magnetic bridge, a pagoda-shaped inner magnetic pole component, a top plate, and a bottom plate, where the multiple wide-envelope outer magnetic pole components are arranged on an outer edge of the Hall thruster, symmetrical about the pagoda-shaped inner magnetic pole component, and enclose a semi-open structure; the magnetic bridge is located between each of the wide-envelope outer magnetic pole components and the pagoda-shaped inner magnetic pole component; the bottom plate is attached to a bottom part of each of the wide-envelope outer magnetic pole components and a bottom part of the pagoda-shaped inner magnetic pole component; and the top plate is attached to an upper part of each of the wide-envelope outer magnetic pole components.

9 Claims, 8 Drawing Sheets

(56) References Cited

U.S. PATENT DOCUMENTS

| | | | | |
|---|---|---|---|---|
| 9,447,779 | B2 * | 9/2016 | Kapulkin .............. | F03H 1/0075 |
| 2005/0086926 | A1 * | 4/2005 | King ..................... | F03H 1/0075<br>60/202 |
| 2005/0247885 | A1 * | 11/2005 | Madocks .............. | F03H 1/0075<br>250/423 R |
| 2008/0093506 | A1 * | 4/2008 | Emsellem ................ | H05H 1/54<br>244/173.1 |

* cited by examiner

Traditional magnetic circuit

Special magnetic pole

MAGNETIC POLE STRUCTURE FOR HALL THRUSTER

CROSS REFERENCE TO THE RELATED APPLICATIONS

This application is the national phase entry of International Application No. PCT/CN2021/130580, filed on Nov. 15, 2021, which is based upon and claims priority to Chinese Patent Application No. 202011587160.2, filed on Dec. 28, 2020, the entire contents of which are incorporated herein by reference.

TECHNICAL FIELD

The present disclosure relates to a magnetic pole structure, and in particular to a magnetic pole structure for a Hall thruster.

BACKGROUND

Hall thrusters have been widely used in various satellites and deep space detectors, etc., and become the standard configuration of high-orbit satellite platforms. The existing Hall thrusters mainly adopt two typical magnetic circuit structures, namely discrete magnetic cylinders and an annular outer magnetic pole. Scholars are committed to further improving the performance of the Hall thruster based on the magnetic field.

For example, Chinese patent application CN104632565B discloses a magnetic circuit structure for a Hall thruster and belongs to the technical field of Hall thrusters. The magnetic circuit structure adopts discrete outer magnetic poles, and pores are arranged on a circumference and a base of a magnetic shield to improve the heat dissipation effect. However, the area of the magnetic flux is reduced, leading to insufficient magnetic conductivity. In particular, when the Hall thruster needs a certain extension, it will face the risk of magnetic saturation. In addition, the magnetic circuit structure does not achieve uniform distribution of the magnetic field and ideal heat dissipation.

The inner and outer magnetic pole structures of the Hall thruster are the key components that affect the magnetic field configuration. Since the magnetic pole works in the core high-temperature zone of the Hall thruster, heat is an important control factor. When the working temperature exceeds 0.78 times the Curie temperature of the magnetic material, the magnetic conductivity of the material will drop sharply until reaching the Curie temperature, resulting in the loss of magnetic conductivity. In a wide-envelope outer magnetic pole structure, outer magnetic poles extend in the circumferential direction to achieve uniform distribution of the magnetic field. Due to the restriction of the magnetic field on electrons, the distribution of the electrons in the discharge channel is uniform, and the electric conductivity, electric field distribution, and ionization rate of electrons along the wall of the transport channel are also uniform in the circumferential direction. Meanwhile, the semi-open structure greatly improves the heat dissipation capacity of the Hall thruster and ultimately achieves the purpose of improving the performance of the Hall thruster. The heat of the inner magnetic pole structure is mainly transferred to the outer magnetic pole, the top plate, and the bottom plate through conduction. The inner magnetic pole structure avoids the design of opening and grooving to reduce the magnetic flux, so it maintains a sufficient magnetic flux margin, thus avoiding magnetic saturation at high temperatures affecting the performance of the Hall thruster. The inner magnetic pole structure adopts a pagoda-shaped design, and the magnetic bridge is supported by an insulating ceramic, which significantly improves the resistance of the Hall thruster to impact.

SUMMARY

In view of the defects in the prior art, an objective of the present disclosure is to provide a magnetic pole structure for a Hall thruster.

The magnetic pole structure for a Hall thruster includes: multiple wide-envelope outer magnetic pole components, a magnetic bridge, a pagoda-shaped inner magnetic pole component, a top plate, and a bottom plate, where the multiple wide-envelope outer magnetic pole components are arranged on an outer edge of the Hall thruster, symmetrical about the pagoda-shaped inner magnetic pole component, and enclose a semi-open structure; the magnetic bridge is located between each of the wide-envelope outer magnetic pole components and the pagoda-shaped inner magnetic pole component, and is connected with a magnetic circuit formed by each of the wide-envelope outer magnetic pole components and the pagoda-shaped inner magnetic pole component; the bottom plate is attached to a bottom part of each of the wide-envelope outer magnetic pole components and a bottom part of the pagoda-shaped inner magnetic pole component; the top plate is attached to an upper part of each of the wide-envelope outer magnetic pole components, and the top plate is provided with a central through hole; and the magnetic bridge and the pagoda-shaped inner magnetic pole component are connected with an outer magnetic circuit through the through hole; and the pagoda-shaped inner magnetic pole component is composed of a pagoda-shaped inner magnetic pole, an upper inner magnetic coil, and a lower inner magnetic coil; the pagoda-shaped inner magnetic pole includes an upper part and a lower part, and the upper part has a diameter less than a diameter of the lower part; the upper part of the pagoda-shaped inner magnetic pole is wound by the upper inner magnetic coil; and the lower part of the pagoda-shaped inner magnetic pole is wound by the lower inner magnetic coil.

Preferably, the magnetic bridge is formed by welding an inner ring and an outer ring; a cavity is formed between the inner ring and the outer ring; the inner ring and the outer ring are provided with uniformly spaced pores; and the outer ring is connected with an outer gas tube.

Preferably, each of the wide-envelope outer magnetic pole components is composed of a wide-envelope outer magnetic pole and an outer magnetic coil; and the outer magnetic coil is wound on the wide-envelope outer magnetic pole.

Preferably, each of the wide-envelope outer magnetic pole components has a circumferential length of d, n wide-envelope outer magnetic pole components have a length of nd, and a circumference is of L, where $0.5 \leq nd/L \leq 0.7$.

Preferably, the multiple wide-envelope outer magnetic pole components are jointly enclosed by a metal mesh.

Preferably, a ceramic plate is provided between the magnetic bridge and the lower inner magnetic coil; and an inner outlet ceramic ring and an outer outlet ceramic ring are arranged on an upper part of the magnetic bridge.

Preferably, the magnetic bridge is made of a soft magnetic material.

Preferably, a working temperature of the magnetic bridge falls in a working temperature range of the soft magnetic material and is less than 0.78 Tc.

Preferably, the wide-envelope outer magnetic pole components and the magnetic bridge have a variety of shapes.

Compared with the prior art, the present disclosure has the following advantages.

1. The wide-envelope outer magnetic poles improve the circumferential distribution uniformity of the magnetic field of the discharge chamber. As the outer magnetic poles extend in the circumferential direction, the magnetic lines of force are introduced into the top plate and the bottom plate from a wide zone and are distributed on the surfaces of the top plate and the bottom plate. In contrast, the magnetic lines of force of discrete circular magnetic cylinders are concentrated diagonally on the surfaces of the top plate and the bottom plate. Therefore, the wide-envelope outer magnetic poles improve the distribution uniformity of the magnetic field, and the ionization in the discharge channel of the Hall thruster is more uniform, thus improving the performance of the Hall thruster.

2. The wide-envelope outer magnetic poles ensure the distribution uniformity of magnetic field and improve the heat dissipation effect. When the Hall thruster works, the main heat sources are as follows. First, the inner working zone generates heat. The temperature in the anode and the discharge chamber area is the highest, and the outer temperature gradually decreases outwards. The heat is transferred mainly by means of radiation and conduction. When the radiation power per unit area is fixed, the heat dissipation is proportional to the area. A smaller blocked area indicates a better radiation effect. Compared with the annular magnetic pole, the wide-envelope magnetic poles form an effective heat dissipation window. Secondly, the coils generate heat. The coils of the inner and outer magnetic poles are energized to generate heat. The wide-envelope magnetic poles increase the circumferential width, and effectively increase the heat dissipation area, facilitating the heat release of the magnetic coils. The pagoda-shaped inner magnetic structure increases the number of turns of the lower coil while the total ampere-turns remain unchanged, effectively reducing the excitation current, reducing the thermal load loss of the Hall thruster, and ultimately improving the efficiency of the Hall thruster. Due to the effective heat dissipation, the temperature of the magnetic bridge is lower than 0.78 Tc, thus avoiding affecting the normal magnetic conductivity of the magnetic bridge.

3. The design of the wide-envelope outer magnetic poles and the pagoda-shaped inner magnetic pole optimizes the magnetic flux. The traditional discrete magnetic cylinders and annular outer magnetic pole are not conducive to magnetic conductivity due to the small area of magnetic conductivity. The design of the present disclosure effectively increases the area of magnetic conductivity, reduces the loss of magnetic resistance, improves the magnetic conductivity, and thus can achieve higher thruster performance.

4. The pagoda-shaped inner magnetic pole includes a thin top end and a thick bottom end. The thick end serves as a load-bearing base to support the magnetic bridge (anode), so as to improve the resistance effect.

5. The magnetic bridge can serve as the magnetic circuit, the discharge channel, and the anode, which greatly reduces the number of parts of the Hall thruster, thus making the Hall thruster more portable and compact.

BRIEF DESCRIPTION OF THE DRAWINGS

Other features, objectives, and advantages of the present disclosure will become more apparent by reading the detailed description of non-limiting embodiments with reference to the following drawings.

DETAILED DESCRIPTION OF THE EMBODIMENTS

Figure 1:
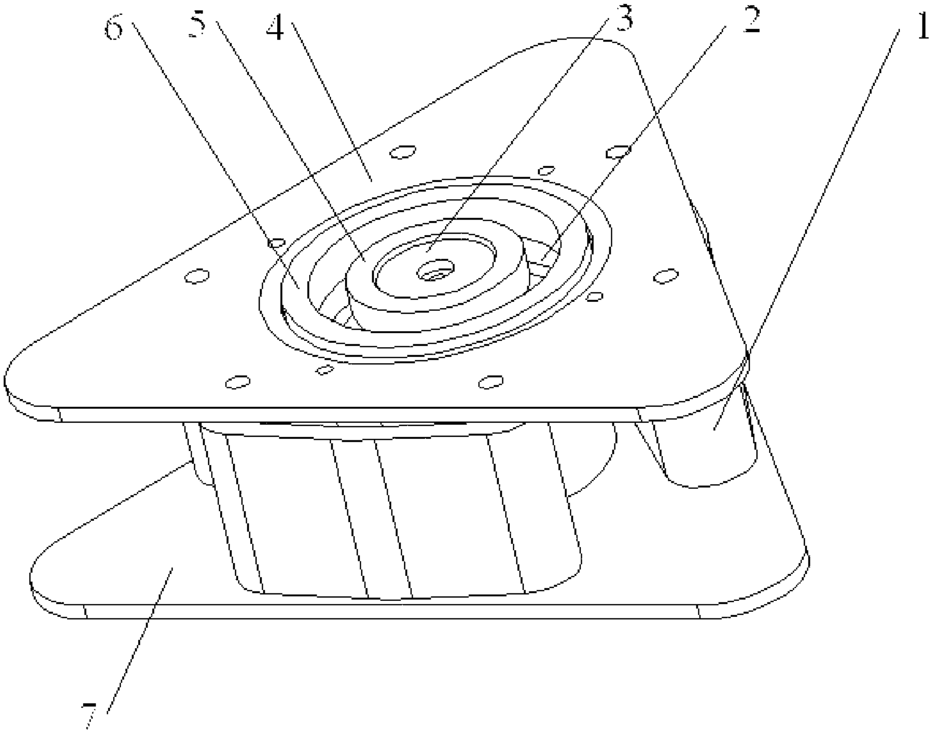
FIG. 1 is a three-dimensional view of a special magnetic pole structure for a Hall thruster.
Figure 2:
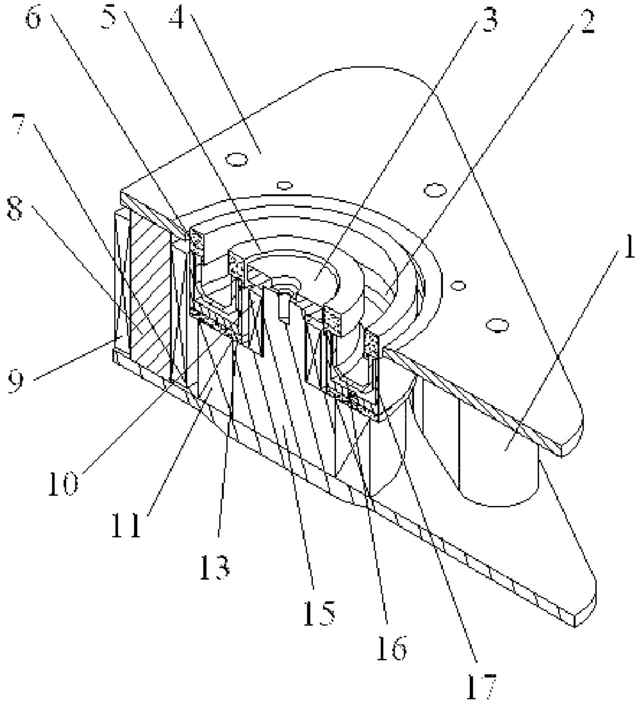
FIG. 2 is a sectional view of the special magnetic pole structure for a Hall thruster.
Figure 3:
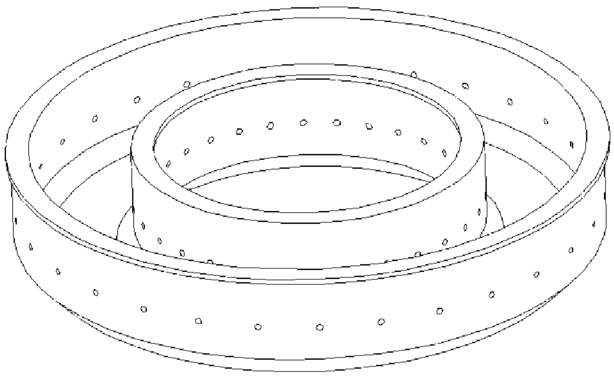
FIG. 3 shows a distribution of pores in an inner ring of a magnetic bridge.
Figure 4:
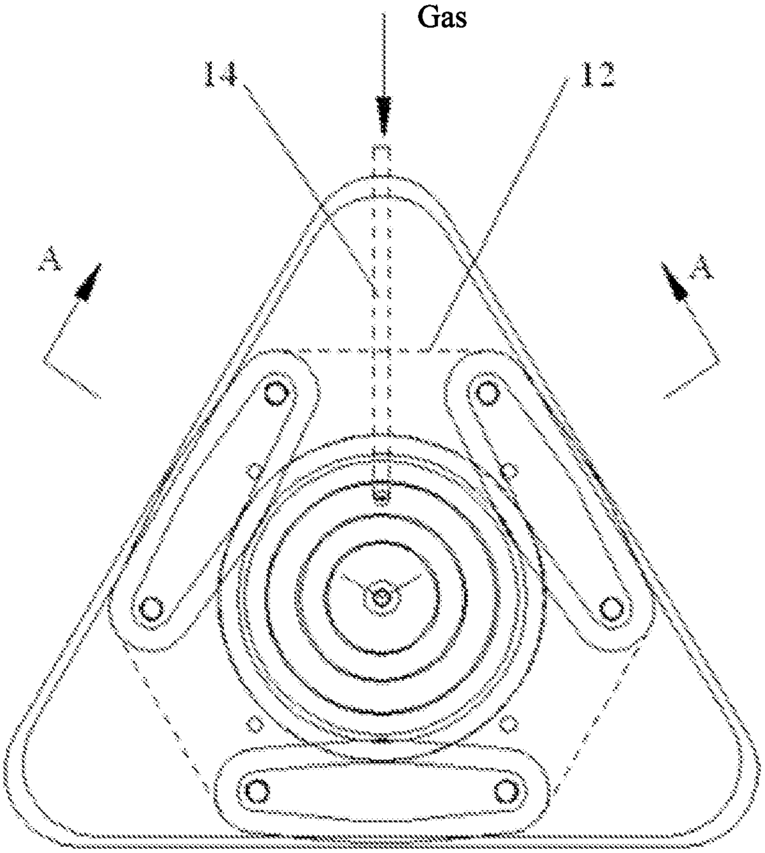
FIG. 4 is a top view of the special magnetic pole structure for a Hall thruster.
Figure 5A:
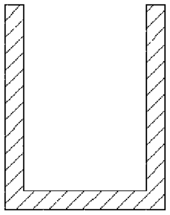
FIGS. 5A-5D show different shapes of the magnetic bridge.
Figure 5B:
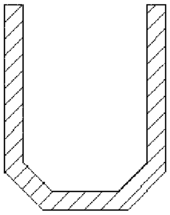
Figure 5C:
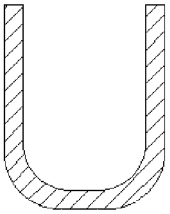
Figure 5D:
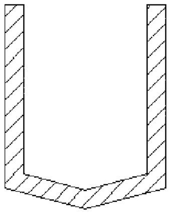

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

As shown in FIGS. 1 to 4, a special magnetic pole structure for a Hall thruster includes: wide-envelope outer magnetic pole components 1, magnetic bridge 2, pagoda-shaped inner magnetic pole component 3, top plate 4, and bottom plate 7. The wide-envelope outer magnetic pole components 1 enclose a semi-open structure. Metal mesh 12 is provided outside the wide-envelope outer magnetic pole components 1 to shield plasma. Inner outlet ceramic ring 5 and outer outlet ceramic ring 6 form an outlet space and are arranged on an upper part of the magnetic bridge 2. The pagoda-shaped inner magnetic component 3 is located on a central axis of the Hall thruster and adopts a variable-section structure with a thin top end and a thick bottom end. Upper inner magnetic coil 10 is wound on an upper part of pagoda-shaped inner magnetic pole 15 and has a small number of turns due to a space limit by the magnetic bridge. Lower inner magnetic coil 11 is wound at a lower part of the pagoda-shaped inner magnetic pole, and has a large number of turns. On the one hand, the thick lower part increases the area of magnetic conductivity, so as to make up for the insufficient magnetic conductivity in the upper part and optimize the magnetic conductivity. On the other hand, more turns wound at the lower part can significantly reduce the excitation current, reduce the magnetic loss of the Hall thruster, effectively reduce the thermal load, and improve the efficiency of the Hall thruster on the premise that the ampere-turns remain unchanged. Meanwhile, the lower part serves as a load-bearing part to support the magnetic bridge 2 (anode). With the increase in the area of magnetic conductivity, the load-bearing area increases correspondingly, thus improving the resistance of the Hall thruster to impact.

The magnetic bridge is composed of inner ring 16 and outer ring 17. Either or both of the two rings can be made of a soft magnetic material as required. The magnetic bridge is located between the inner and outer magnetic poles. A magnetic circuit is provided with a magnetic leakage gap between the magnetic bridge and the inner and outer magnetic poles and finally forms a closed loop. A required magnetic field is formed in a channel of a discharge chamber to restrict the movement of electrons and accelerate the ion ejection to form a thrust. A cavity is formed between the inner ring 16 and the outer ring 17. Pores are uniformly distributed on the inner ring 16. A gas is introduced into the cavity by a gas tube. After buffering and uniform distribution, the gas enters a discharge channel formed by the magnetic bridge 2 through the small holes. Insulating ceramic plate 13 is located between the lower inner magnetic coil 11 and the magnetic bridge 2 (anode) and plays an insulating role. The magnetic bridge is in direct contact with a discharge working zone. Through the reasonable thermal design, the working temperature of the magnetic bridge is in a working range of the soft magnetic material, that is, less than 0.78 Tc (Tc refers to Curie temperature). Therefore, the Hall thruster can work normally without affecting the normal magnetic conductivity of the magnetic bridge.

Figure 7:
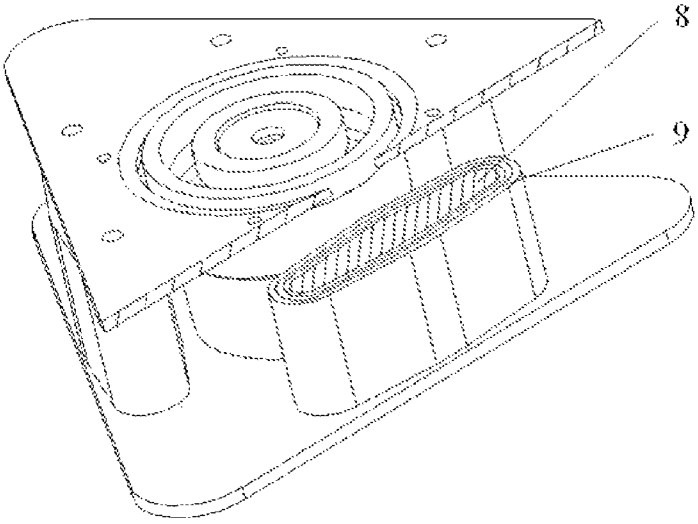
FIG. 7 is a sectional view of a wide-envelope round-diamond-shaped outer magnetic pole.

Specifically, as shown in FIG. 7, a preferred embodiment of the present disclosure provides a special magnetic pole structure. Compared with the discrete magnetic cylinders and annular magnetic pole structure of a traditional Hall thruster, the special magnetic pole structure of the present disclosure adopts wide-envelope outer magnetic poles 8. The wide-envelope outer magnetic poles extend outside the Hall thruster, achieving uniform distribution of the magnetic field and uniform ionization in the discharge channel, thus improving the efficiency of the Hall thruster. The magnetic bridge 2 is made of a magnetic conductive material and also serves as a magnetic shield. Compared with the traditional Hall thruster, a width of the magnetic bridge 2 is slightly larger than a width of the outlet ceramic, and the magnetic bridge 2 is shallower. In this way, a steep magnetic field configuration is formed, leading to a steep gradient of radial magnetic induction intensity, thus improving the acceleration performance and specific impulse of the Hall thruster.

Figure 8:
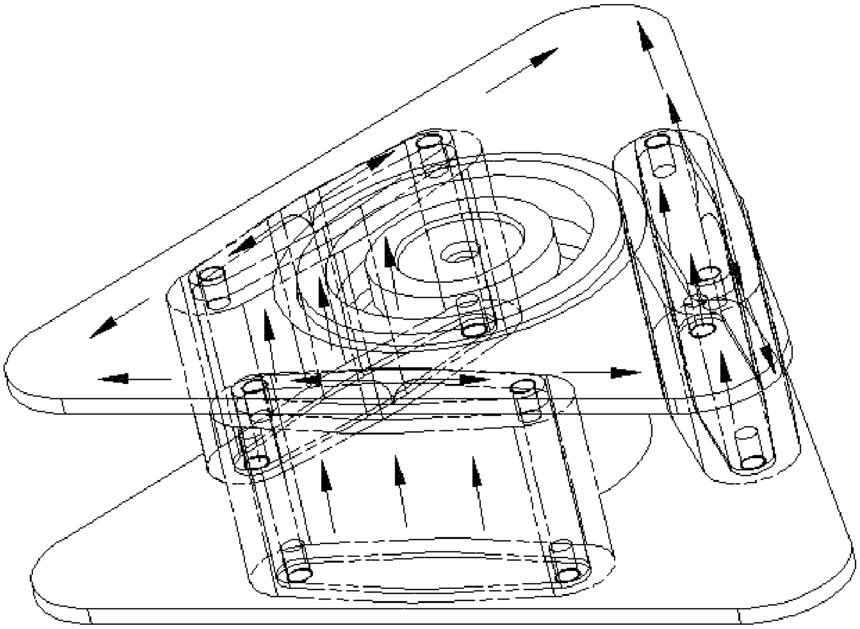
FIG. 8 is a three-dimensional diagram showing a flow direction of magnetic conductivity of the special magnetic pole structure for a Hall thruster.
Figure 9:
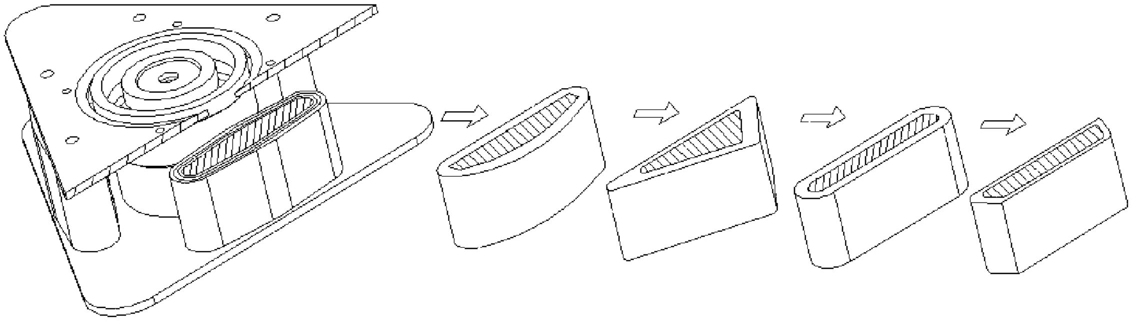
FIG. 9 shows the wide-envelope outer magnetic poles with different shapes.
Figure 10:
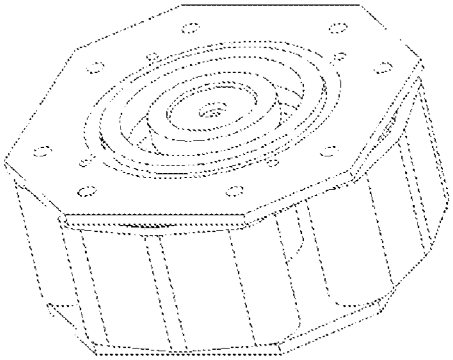
FIG. 10 is an exterior view of a magnetic pole structure for a Hall thruster with four wide-envelope round-diamond-shaped outer magnetic poles.

More specifically, as shown in FIGS. 8 to 10, the wide-envelope outer magnetic pole components 1 are formed by winding outer magnetic coils 9 outside the wide-envelope outer magnetic poles 8, respectively. The wide-envelope outer magnetic pole components are uniformly distributed on the outer edge of the Hall thruster, fixed on the bottom plate 7, and are pressed by the top plate 4. The wide-envelope outer magnetic pole components 1 each have a circumferential length of d. That is, n wide-envelope outer magnetic pole components have a length of nd, and a circumference is of L, where $0.5 \leq nd/L \leq 0.7$. The wide-envelope magnetic poles 8 feature a uniform distribution of the magnetic field, which makes a gas medium uniformly ionized in the discharge channel, thus improving the performance of the Hall thruster. In addition, the wide-envelope magnetic poles form an effective heat dissipation window. The wide-envelope outer magnetic poles 8 can have different shapes, such as a round diamond, arch, triangle, plane, and trapezoid.

As shown in FIGS. 5A-5D, the rings of the magnetic bridge can have different shapes, such as double-L shape, chamfer U shape, arc U shape, and taper, to adapt to different spatial constraints in the Hall thruster.

Figure 6:
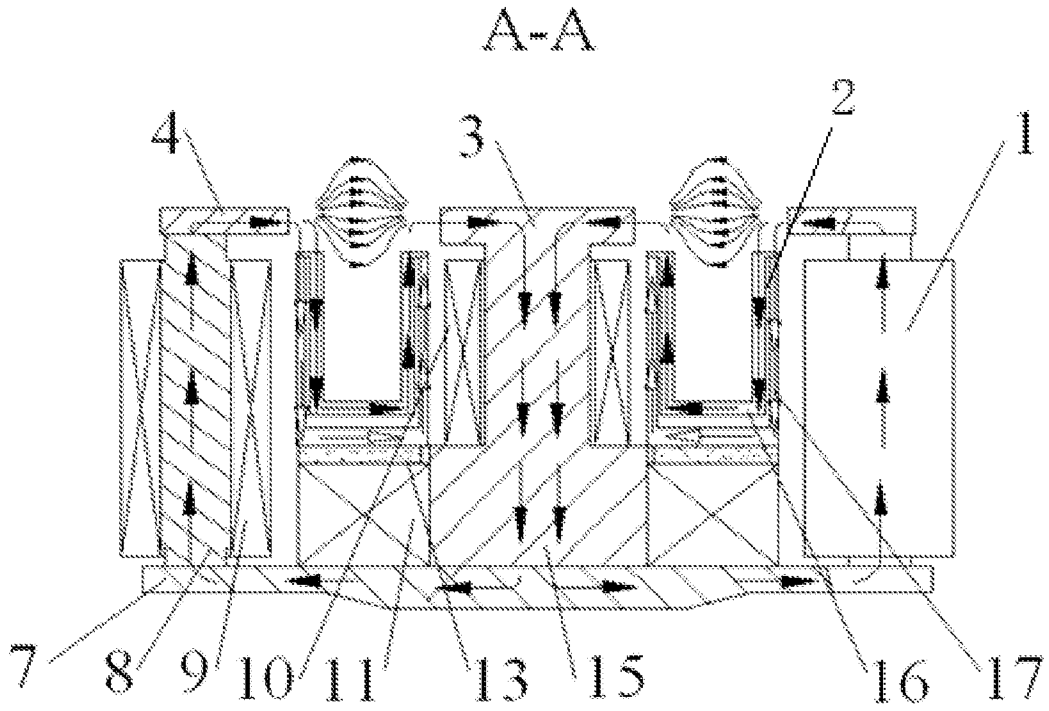
FIG. 6 is a two-dimensional sectional view of the special magnetic pole structure for a Hall thruster.

FIG. 6 shows a flow direction of the magnetic conductivity of the special magnetic pole structure for the Hall thruster. It can be seen from the figure that the magnetic circuit is divided into a left branch and a right branch. Each branch starts from the wide-envelope outer magnetic pole 1, flows through the magnetic bridge 2, and forms magnetic leakage at the outlet. The two branches converge at the central pagoda-shaped inner magnetic pole 3 and flow to the bottom plate 7. Finally, the left and right branches flow back to the top plate 4 from the two wide-envelope outer magnetic poles 1.

Figure 11:
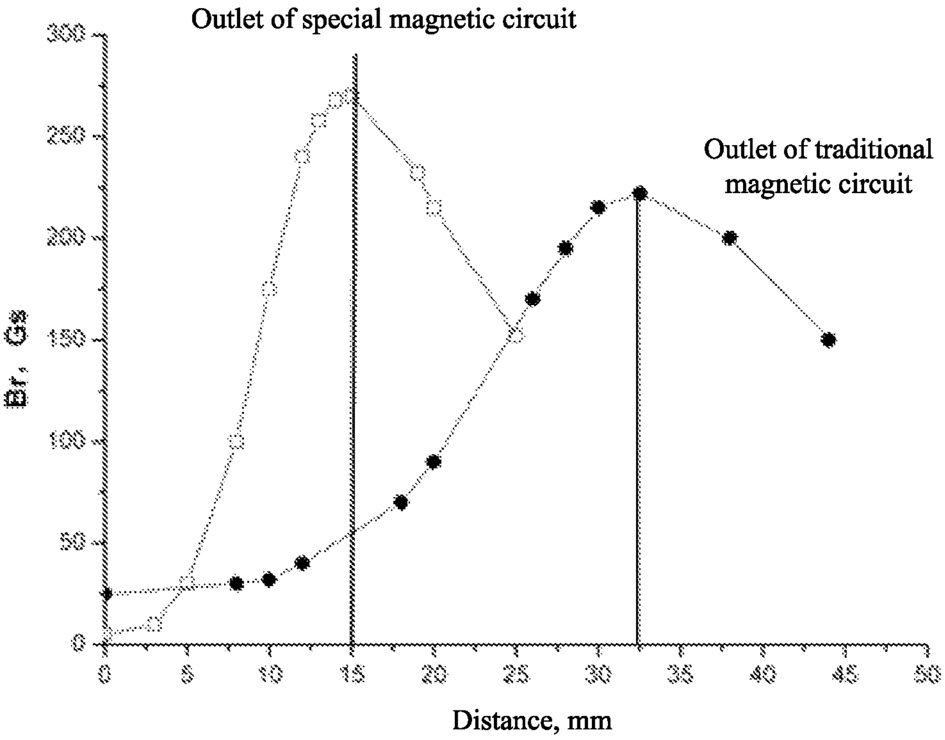
FIG. 11 shows a comparison of radial magnetic induction intensities of the special magnetic pole structure and a traditional magnetic circuit structure for a Hall thruster.

FIG. 11 shows a comparison of radial magnetic induction intensities of the special magnetic pole structure and the traditional magnetic circuit structure for the Hall thruster. It can be seen from the figure that the magnetic field gradient of the special magnetic pole structure is steeper, reaching 41 Gs/mm, while the magnetic field gradient of the traditional magnetic circuit structure is only 13 Gs/mm. In addition, compared with the traditional magnetic circuit structure, the maximum radial magnetic induction intensity of the special magnetic pole structure increases from 230 Gs to 270 Gs, the radial magnetic induction intensity of the anode decreases from 25 Gs to 5 Gs, the outlet position of the discharge chamber moves from 32.5 mm to 15 mm, and the length of the acceleration zone is compressed from 25 mm to 3 mm. With this magnetic field configuration, a plume divergence angle decreases by 55%, from 90° to 40°, the specific impulse performance of the Hall thruster increases by 35%, and the efficiency of the Hall thruster increases by 20%.

Figure 12:
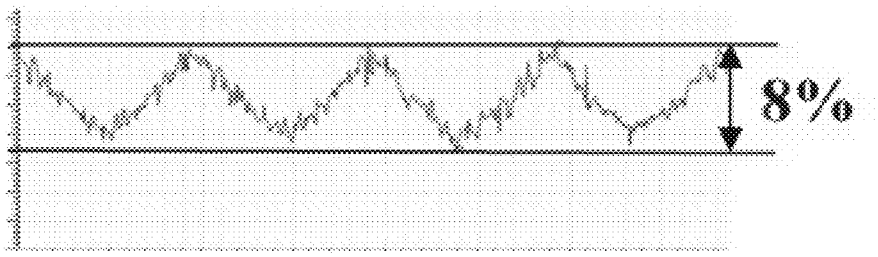
FIG. 12 shows a comparison of circumferential magnetic field uniformity of the special magnetic pole structure and the traditional magnetic circuit structure for a Hall thruster.
Figure 12:
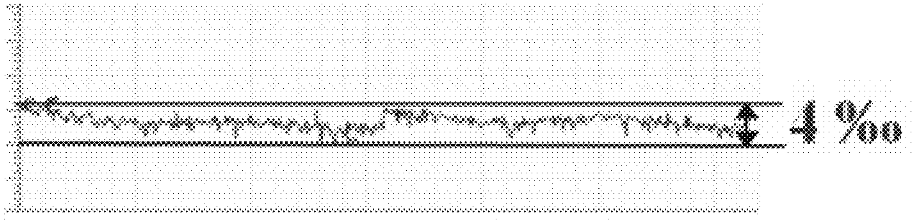

As shown in FIG. 12, the special magnetic pole structure improves the distribution uniformity of the magnetic field. A circumferential fluctuation of the magnetic field of the traditional magnetic circuit is 8%, while the circumferential fluctuation of the magnetic field of the special magnetic pole structure decreases by an order of magnitude, only 4‰. The distribution uniformity of the magnetic field of the special magnetic pole structure is improved, which makes the ionization in the discharge channel of the Hall thruster more uniform, thus improving the performance of the Hall thruster. In addition, the special magnetic pole structure also greatly reduces the influence of magnetic field bump on the thrust output, and significantly reduces the thrust vector eccentricity.

In the description of the present application, it needs to be understood the orientation or positional relationships indicated by terms, such as "up", "down", "front", "rear", "left", "right", "vertical", "horizontal", "top", "bottom", "inside", and "outside", are based on the orientation or positional relationship shown in the drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be freely combined with each other in a non-conflicting manner.

What is claimed is:

1. A magnetic pole structure for a Hall thruster, comprising: a plurality of wide-envelope outer magnetic pole components, a magnetic bridge, a pagoda-shaped inner magnetic pole component, a top plate, and a bottom plate, wherein the plurality of wide-envelope outer magnetic pole components are arranged on an outer edge of the Hall thruster and symmetrical about the pagoda-shaped inner magnetic pole component, and the plurality of wide-envelope outer magnetic pole components enclose a semi-open structure;

the magnetic bridge is located between each of the plurality of wide-envelope outer magnetic pole components and the pagoda-shaped inner magnetic pole component, and is connected with a magnetic circuit formed by each of the plurality of wide-envelope outer magnetic pole components and the pagoda-shaped inner magnetic pole component;

the bottom plate is attached to a bottom part of each of the plurality of wide-envelope outer magnetic pole components and a bottom part of the pagoda-shaped inner magnetic pole component;

the top plate is attached to an upper part of each of the plurality of wide-envelope outer magnetic pole components, and the top plate is provided with a central through hole; and the magnetic bridge and the pagoda-shaped inner magnetic pole component are connected with an outer magnetic circuit through the central through hole; and the pagoda-shaped inner magnetic pole component is composed of a pagoda-shaped inner magnetic pole, an upper inner magnetic coil, and a lower inner magnetic coil;

the pagoda-shaped inner magnetic pole comprises an upper part and a lower part, and the upper part has a diameter less than a diameter of the lower part;

the upper part of the pagoda-shaped inner magnetic pole is wound by the upper inner magnetic coil; and the lower part of the pagoda-shaped inner magnetic pole is wound by the lower inner magnetic coil.

2. The magnetic pole structure according to claim 1, wherein the magnetic bridge is formed by welding an inner ring and an outer ring; a cavity is formed between the inner ring and the outer ring; the inner ring and the outer ring are provided with uniformly spaced pores; and the outer ring is connected with an outer gas tube.

3. The magnetic pole structure according to claim 1, wherein each of the plurality of wide-envelope outer magnetic pole components is composed of a wide-envelope outer magnetic pole and an outer magnetic coil; and the outer magnetic coil is wound on the wide-envelope outer magnetic pole.

4. The magnetic pole structure according to claim 1, wherein each of the plurality of wide-envelope outer magnetic pole components has a circumferential length of d, n wide-envelope outer magnetic pole components have a length of nd, and a circumference is of L, wherein $0.5 \leq nd/L \leq 0.7$.

5. The magnetic pole structure according to claim 1, wherein the plurality of wide-envelope outer magnetic pole components are jointly enclosed by a metal mesh.

6. The magnetic pole structure according to claim 1, wherein a ceramic plate is provided between the magnetic bridge and the lower inner magnetic coil; and an inner outlet ceramic ring and an outer outlet ceramic ring are arranged on an upper part of the magnetic bridge.

7. The magnetic pole structure according to claim 2, wherein the magnetic bridge is made of a soft magnetic material.

8. The magnetic pole structure according to claim 7, wherein a working temperature of the magnetic bridge falls in a working temperature range of the soft magnetic material, and is less than 0.78 Tc (Tc refers to Curie temperature).

9. The magnetic pole structure according to claim 1, wherein the plurality of wide-envelope outer magnetic pole components and the magnetic bridge have a variety of shapes.

* * * * *